United States Patent
Heinl

(10) Patent No.: US 8,511,524 B2
(45) Date of Patent: Aug. 20, 2013

(54) GOLFER'S AID

(76) Inventor: John H. Heinl, Springhill, FL (US)

( * ) Notice: Subject to any disclaimer, the term of this patent is extended or adjusted under 35 U.S.C. 154(b) by 748 days.

(21) Appl. No.: 12/579,545

(22) Filed: Oct. 15, 2009

(65) Prior Publication Data

US 2011/0089211 A1 Apr. 21, 2011

(51) Int. Cl.
*B60R 7/00* (2006.01)
*B60R 9/00* (2006.01)

(52) U.S. Cl.
USPC .................. 224/274; 224/276; 224/567

(58) Field of Classification Search
USPC ............... 224/274, 276, 567, 918, 545, 917.5
See application file for complete search history.

(56) References Cited

U.S. PATENT DOCUMENTS

| | | | | |
|---|---|---|---|---|
| 1,773,337 A * | 8/1930 | Barlow | ............................ | 40/644 |
| 2,115,274 A * | 4/1938 | McCabe | .................... | 248/188.1 |
| 2,448,105 A * | 8/1948 | Lynch | ............................ | 131/257 |
| 2,554,544 A * | 5/1951 | Warner | ......................... | 359/809 |
| 2,661,222 A * | 12/1953 | Wolfe | ............................ | 281/51 |
| 2,826,206 A * | 3/1958 | Slater | ............................. | 131/257 |
| 2,931,365 A * | 4/1960 | Mckenzie | ..................... | 131/241 |
| 3,128,021 A * | 4/1964 | Habbena | ........................ | 224/274 |
| 3,428,286 A * | 2/1969 | Del Pesco | ..................... | 248/474 |
| 4,071,174 A * | 1/1978 | Weiner | ........................... | 224/277 |
| 4,603,944 A * | 8/1986 | Greenlaw et al. | ............. | 359/818 |
| 5,083,736 A * | 1/1992 | McCoy | .......................... | 248/452 |
| 5,267,716 A * | 12/1993 | Friedman | .................... | 248/291.1 |
| 5,435,474 A * | 7/1995 | Lin | ................................. | 224/274 |
| 5,678,740 A * | 10/1997 | Wang | ............................. | 224/274 |
| 5,706,832 A * | 1/1998 | Gold | ........................... | 131/240.1 |
| 5,847,883 A * | 12/1998 | Rispoli, Sr. | ................... | 359/802 |
| 5,848,742 A * | 12/1998 | Wang | ............................. | 224/274 |
| 6,023,377 A * | 2/2000 | Slager | ........................... | 359/802 |
| 6,059,158 A * | 5/2000 | Hsu | ................................ | 224/274 |
| 6,227,425 B1 * | 5/2001 | Ware, Sr. | ....................... | 224/276 |
| 6,305,217 B1 * | 10/2001 | Mansfeld et al. | ........... | 73/114.61 |
| D488,493 S * | 4/2004 | Stachowski et al. | .......... | D16/135 |
| 2004/0041067 A1 * | 3/2004 | Jung | ............................. | 248/444.1 |

FOREIGN PATENT DOCUMENTS

GB    111437 A * 7/1983

* cited by examiner

*Primary Examiner* — Nathan J Newhouse
*Assistant Examiner* — Lester L Vanterpool
(74) *Attorney, Agent, or Firm* — Wood, Herron & Evans, LLP

(57) ABSTRACT

In one embodiment, a golfer's aid includes a bracket configured to be attached to a score card holder on the steering wheel of a golf cart. The bracket includes a main body and a leg extending from the main body. A recess near the distal end of the leg is sized to be received over an edge portion of the score card holder, and a fastener associated with the recess can be adjusted to clamp the bracket to the score card holder. The golfer's aid further includes a magnifying viewer coupled to the main body of the bracket whereby the user can view a score card on the score card holder through the magnifying viewer.

12 Claims, 2 Drawing Sheets

GOLFER'S AID

TECHNICAL FIELD

The present invention relates generally to devices that facilitate viewing small printed material and, more particularly, to a device for use in viewing a golf score card or other similar item.

BACKGROUND

Many people who enjoy playing golf have trouble reading small print, such as that found on golf score cards. This problem is particularly bothersome for persons who must wear corrective lenses for viewing objects and/or printed material at close distances. Many persons that require corrective lenses for reading prefer not to wear glasses while golfing, either because the glasses interfere with properly sighting a ball, or because wearing glasses inhibits their ability to swing. Moreover, many persons that require corrective lenses for reading do not need glasses for distance viewing. Typically, such golfers will have to put on glasses in order to read and/or mark their score card, and then must take their glasses off to swing a club, leading to an increased risk of losing their glasses.

A need therefore exists for a device that aids golfers in viewing and/or marking their score cards.

SUMMARY

The present invention overcomes the foregoing and other shortcomings and drawbacks of devices heretofore known for use by golfers. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, a golfer's aid includes a bracket configured to be attached to a score card holder on the steering wheel of a golf cart. The bracket includes a main body and at least one leg extending from the main body. A recess near the distal end of the leg is sized to be received over an edge portion of the score card holder, and a fastener associated with the recess can be adjusted to clamp the bracket to the score card holder. The golfer's aid further includes a magnifying viewer coupled to the main body of the bracket whereby the user can view a score card on the score card holder through the magnifying viewer.

In another aspect, the magnifying viewer includes a magnifying lens supported from the main body of the bracket by a support arm. The support arm may be pivotally adjusted relative to the main body of the bracket, or the support arm may be adjusted to vary a spacing between the magnifying lens and the man body. In another aspect, the support arm includes a hinge that permits the magnifying lens to be pivotally moved in a direction toward the main body.

In yet another aspect, the golfer's aid may include one or more apertures for receiving and holding pencils or other writing instruments. One or more other apertures may be provided for holding tees. The golfer's aid may further include a pencil sharpener and/or a cigar/cigarette holder.

The above and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate exemplary embodiments of the invention and, together with a general description given above, and the detailed description given below, serve to explain the invention in sufficient detail to enable one of ordinary skill in the art to which the invention pertains to make and use the invention.

DETAILED DESCRIPTION

Figure 1:
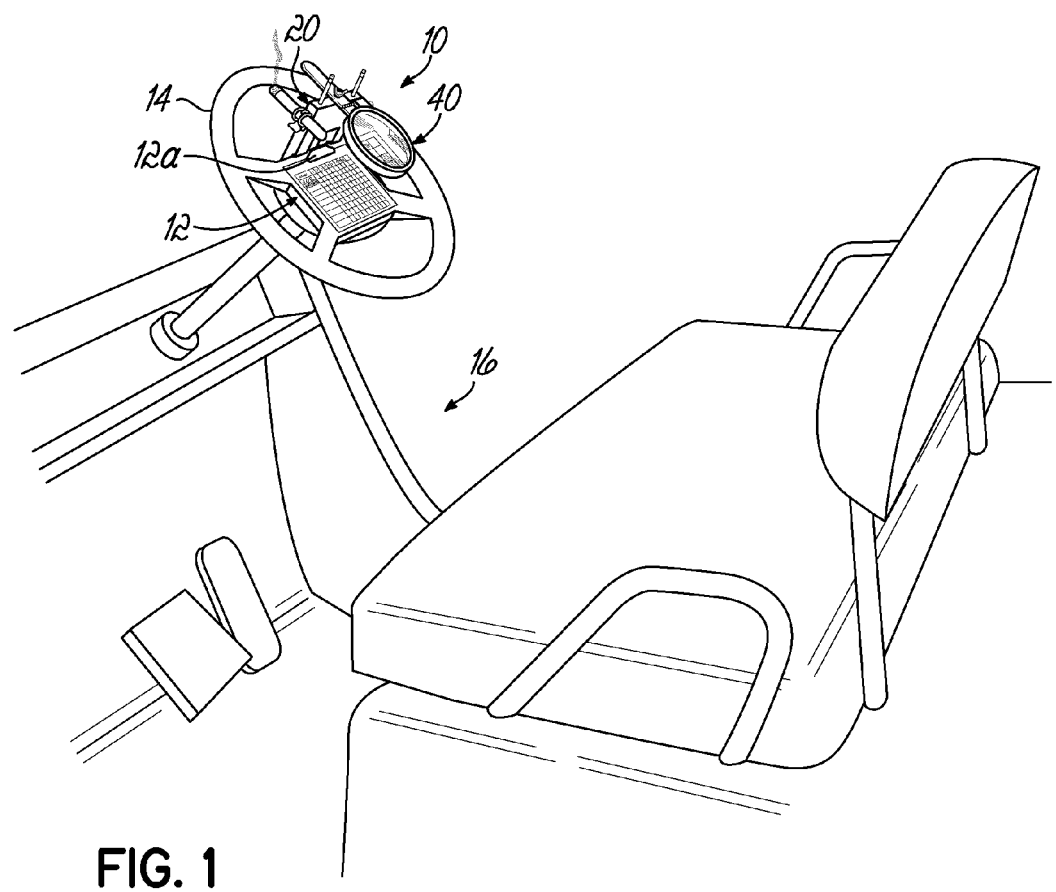
FIG. 1 is a perspective view of an exemplary golfer's aid in accordance with one embodiment of the present invention being used with a golf cart.
Figure 2:
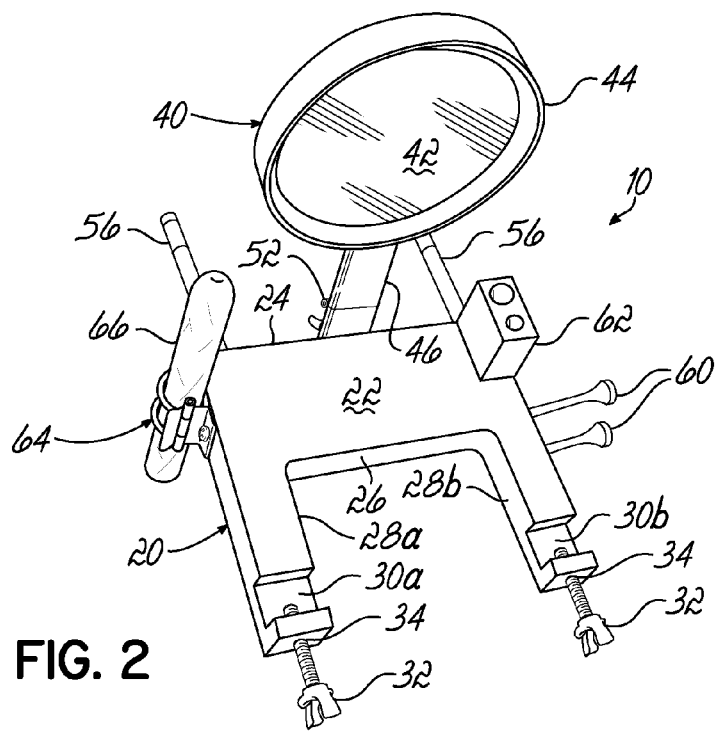
FIG. 2 is a perspective view of the golfer's aid of FIG. 1.
Figure 3:
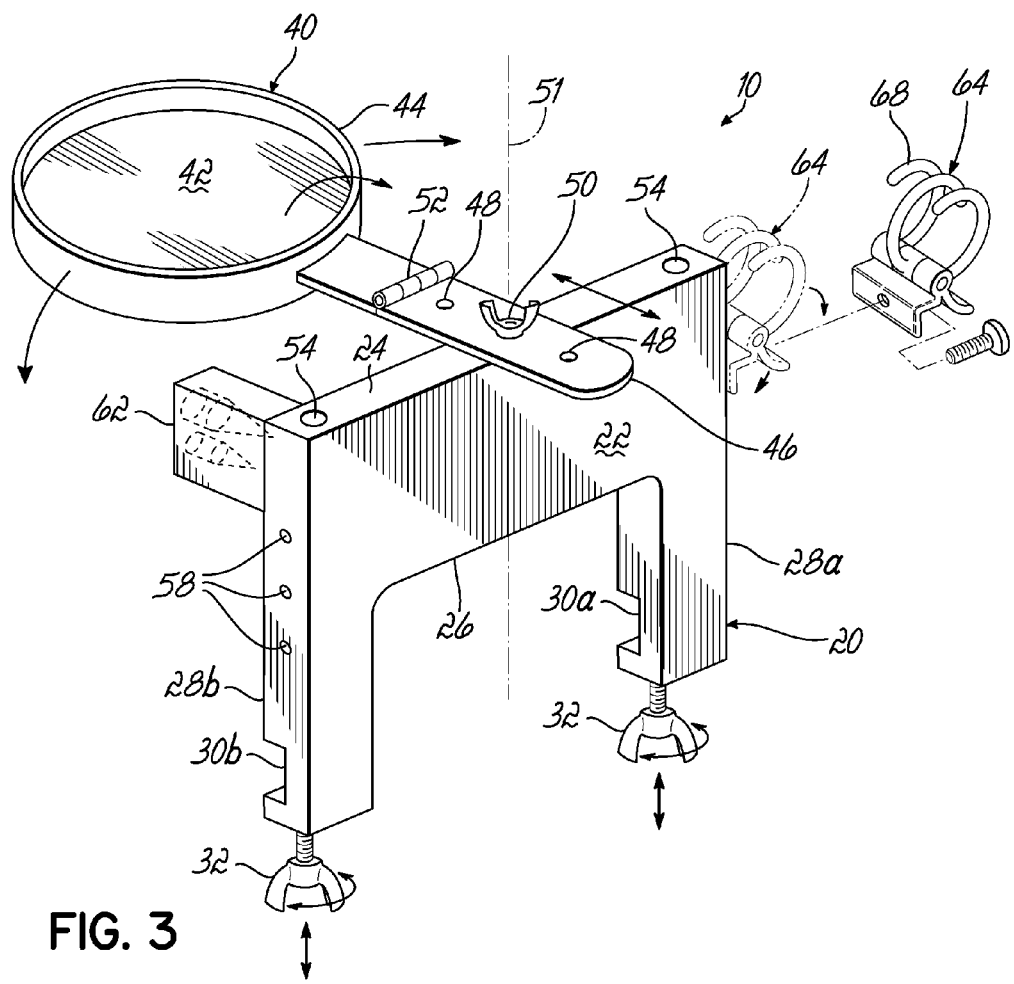
FIG. 3 is another perspective view, from a different angle, of the golfer's aid of FIG. 2.

FIG. 1 depicts an exemplary golfer's aid 10 in accordance with one embodiment of the present invention and secured to a score card holder 12 on the steering wheel 14 of a golf cart 16. With continued reference to FIG. 1, and referring further to FIGS. 2 and 3, the golfer's aid 10 includes a bracket 20 that is configured to be attached to the score card holder 12 on the steering wheel 14 of the golf cart 16. In the exemplary embodiment shown, the bracket 20 comprises a main bracket body 22 having a first end 24 and an oppositely disposed second end 26. A pair of legs 28a, 28b extends from the second end 26 of the main body 22, generally in a direction away from the main body 22. In the embodiment shown, the first and second legs 28a, 28b of the bracket 20 are spaced apart a distance sufficient to facilitate securing the bracket 20 to the score card holder 12 with the first and second legs 28a, 28b straddling a card-holding clip 12a on the score card holder 12. While first and second legs 28a, 28b are shown and described herein, it will be appreciated that bracket 20 may alternatively include only a single leg, or may include more than two legs for securing the golfer's aid 10 to a score card holder 12.

Recesses 30a, 30b are formed proximate the distal ends of each leg 28a, 28b and are sized to receive an edge portion of the score card holder 12 such that the bracket 20 can be secured adjacent an edge of the score card holder 12. Fasteners 32 provided adjacent the recesses 30a, 30b cooperate with the recesses 30a, 30b to facilitate securely attaching the bracket 20 to the score card holder 12. In the embodiment shown, the fasteners 32 comprise wing bolts that are threadably received into tapped holes 34 in the distal ends of the first and second legs 28a, 28b, whereby free ends of the wing bolts may be advanced into the recesses 30a, 30b to clamp an edge of the score card holder 12. It will be appreciated, however, that various other structure and methods may be used to facilitate attaching the bracket 20 to the score card holder 12.

The golfer's aid 10 further includes a magnifying viewer 40 operatively coupled to the first end 24 of the main body 22. In the embodiment shown, the magnifying viewer 40 includes a magnifying lens 42 secured within a frame 44 and supported a distance spaced from the bracket 20 by a support arm 46. In this embodiment, the support arm 46 includes a plurality of spaced apertures 48 for securing the support arm 46 to the first end 24 of the main body 22 of bracket 20, such as by a wing bolt 50 or other suitable fasteners. In this configuration, the position of the magnifying lens 42 may be pivotally adjusted about an axis 51 by loosening the wing bolt 50 and pivoting the support arm 46 about the wing bolt 50 to a desired orientation and position relative to the first and second legs 28a, 28b. Pivotal adjustment of magnifying viewer 40 relative to bracket 20 permits the use of a smaller, less bulky magnifying lens 42 while enabling a user to scan an entire score card, or at least a substantial portion thereof, mounted on score card holder 12 by moving the magnifying lens 42 as needed.

The relative distance between the magnifying lens 42 and the bracket 20 may also be adjusted by selectively securing the wing bolt 50 through a desired one of the apertures 48 in the support arm 46. In another embodiment, the support arm 46 may further include a hinge 52 that facilitates pivoting the magnifying lens 42 in a direction toward the first end 24 of the bracket main body 22. Magnifying lens 42 may therefore be pivoted about hinge 52 to a position that permits easy access to score card holder 12, or which stows magnifying viewer 40 out of the way when not in use.

The golfer's aid 10 may further include one or more first apertures 54 formed in the main body 22 and sized to receive and support a pencil 56, or other writing instrument, therein. In the embodiment shown, first apertures 54 are provided in the first end 24 of the main body 22 of the bracket 20. It will be appreciated, however, that first apertures 54 for receiving and supporting a pencil 56 may alternatively be provided at various other locations on the bracket 20. The golfer's aid 10 may further include at least one second aperture 58 in the bracket 20 for receiving and supporting a golf tee 60 therein. The golfer's aid 10 may further include a pencil sharpener 62 operatively coupled to the bracket 20. While the pencil sharpener 62 is shown and described herein as being a separate component operatively coupled to the bracket 20 of the golfer's aid 10, it will be appreciated that the pencil sharpener 62 may alternatively be integrally formed with the bracket 20.

The golfer's aid 10 may further include a clamp 64 operatively coupled to the bracket 20 for receiving and supporting a cigarette or cigar 66 adjacent the bracket 20. In the embodiment shown, the clamp 64 includes at least one movable member 68 sized and shaped to releasably support a cigarette or cigar 66 thereon.

In use, the golfer's aid 10 may be secured adjacent an edge of a score card holder 12 on the steering wheel 14 of a golf cart 16 by fitting the edge of the score card holder 12 into the recesses 30a, 30b in the first and second legs 28a, 28b of the bracket 20 such that the magnifying viewer 40 is positioned generally above the score card holder 12. The spacing of the legs 28a, 28b of the bracket 20 permit the bracket 20 to be secured to the score card holder 12 with the legs 28a, 28b straddling a clip 12a on the score card holder 12 for holding a score card. The position of the magnifying lens 42 may be selectively adjusted to a position desired by the user, as described above, and may be flipped up out of the way to provide convenient access to the score card holder 12. In addition, the various other features such as apertures 54, 58 for receiving and supporting pencils 56 and/or tees 60, a pencil sharpener 62 for conveniently sharpening dull or broken pencils 56, and a cigar/cigarette clamp 64 facilitate the user's enjoyment during play.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A golfer's aid, comprising:
a bracket configured to be attached to a score card holder on the steering wheel of a golf cart, said bracket comprising:
   a main body defining a peripheral side surface, and including a first end and an oppositely disposed second end,
   at least one leg extending from said second end of said main body, and
   a recess formed proximate a distal end of said leg, said recess sized to be received over an edge portion of the score card holder;
a fastener associated with said recess, said fastener operable to secure said bracket to the score card holder;
at least one aperture in said bracket, said aperture sized to receive and support a pencil therein; and
a magnifying viewer operatively coupled to said peripheral side surface adjacent said first end of said main body for selective positioning of said magnifying viewer relative to said main body.

2. The golfer's aid of claim 1, further comprising:
a pencil sharpener operatively coupled to said bracket.

3. The golfer's aid of claim 1, further comprising:
a clamp operatively coupled to said bracket, said clamp comprising at least one movable member sized and shaped to releasably support at least one of a cigar or a cigarette thereon.

4. The golfer's aid of claim 1, wherein said magnifying viewer comprises:
a magnifying lens; and
a support arm;
said support arm coupled to said first end of said main body and supporting said magnifying lens a distance spaced from said main body.

5. The golfer's aid of claim 4, wherein said support arm includes a hinge that permits said magnifying lens to be pivotally moved in a direction toward said first end of said main body.

6. The golfer's aid of claim 4, wherein the support arm is adjustable to vary a spacing between said main body and said magnifying lens.

7. The golfer's aid of claim 4, wherein said support arm is pivotally adjustable to position said magnifying lens adjacent said at least one leg.

8. The golfer's aid of claim 1, wherein said recess comprises a channel formed in said leg, and said fastener threadably extends into said channel and engages the scorecard holder when said bracket is secured to the score card holder.

9. A golfer's aid, comprising:
a bracket configured to be attached to a score card holder on the steering wheel of a golf cart, said bracket comprising:
   a main body defining a peripheral side surface, and including a first end and an oppositely disposed second end,
   at least one leg extending from said second end of said main body, and
   a recess formed proximate a distal end of said leg, said recess sized to be received over an edge portion of the score card holder;
a fastener associated with said recess, said fastener operable to secure said bracket to the score card holder;
a magnifying viewer operatively coupled to said peripheral side surface adjacent said first end of said main body for selective positioning of said magnifying viewer relative to said main body; and at least one aperture in said bracket, said aperture sized to receive and support a golf tee therein.

10. A golfer's aid, comprising:
a bracket configured to be attached to a score card holder on the steering wheel of a golf cart, said bracket comprising:
  a main body defining a peripheral side surface, and including a first end and an oppositely disposed second end,
  first and second legs extending from said second end of said main body, and
  a recess formed proximate a distal end of said leg, said recess sized to be received over an edge portion of the score card holder;
a fastener associated with said recess, said fastener operable to secure said bracket to the score card holder; and
a magnifying viewer operatively coupled to said peripheral side surface adjacent said first end of said main body for selective positioning of said magnifying viewer relative to said main body.

11. The golfer's aid of claim 10, wherein said first and second legs are spaced apart a distance sufficient to facilitate securing said bracket to the score card holder with said legs straddling a clip on the score card holder for holding a score card, whereby said magnifying viewer can be positioned generally over the score card holder when said bracket is secured thereto.

12. A golfer's aid, comprising:
a bracket configured to be attached to a score card holder on the steering wheel of a golf cart, said bracket comprising:
  a main body defining a peripheral side surface, and including a first end and an oppositely disposed second end, and first and second oppositely disposed lateral ends extending between said first and second ends,
  first and second legs extending from said second end of said main body, and
  a recess formed proximate a distal end of each of said first and second legs, said recess sized to be received over an edge portion of the score card holder;
a fastener associated with said recess of each of said first and second legs and operable to secure said bracket to the score card holder;
a magnifying viewer operatively coupled to said peripheral side surface adjacent said first end of said main body for selective positioning of said magnifying viewer relative to said main body;
at least one first aperture in said main body or said legs, said first aperture sized to receive and support a pencil therein;
at least one second aperture in said main body or said legs, said second aperture sized to receive and support a golf tee therein; and
a clamp operatively coupled to said peripheral side surface adjacent at least one of said first or second lateral ends of said main body, said clamp comprising at least one movable member sized and shaped to releasably support at least one of a cigar or a cigarette thereon.

* * * * *